(12) United States Patent
Krishnan et al.

(10) Patent No.: US 11,812,124 B2
(45) Date of Patent: Nov. 7, 2023

(54) SENSOR ASSEMBLY COVER LOCK

(71) Applicant: Ford Global Technologies, LLC, Dearborn, MI (US)

(72) Inventors: Venkatesh Krishnan, Canton, MI (US); Rashaun Phinisee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 778 days.

(21) Appl. No.: 16/749,235

(22) Filed: Jan. 22, 2020

(65) Prior Publication Data
US 2021/0227104 A1    Jul. 22, 2021

(51) Int. Cl.
| | |
|---|---|
| H04N 23/51 | (2023.01) |
| B60R 11/04 | (2006.01) |
| E05B 47/00 | (2006.01) |
| E05B 81/08 | (2014.01) |
| H04N 7/18 | (2006.01) |
| G07C 9/00 | (2020.01) |
| E05B 81/64 | (2014.01) |
| B60R 25/34 | (2013.01) |
| B60R 11/00 | (2006.01) |

(52) U.S. Cl.
CPC ............ *H04N 23/51* (2023.01); *B60R 11/04* (2013.01); *B60R 25/34* (2013.01); *E05B 47/0002* (2013.01); *E05B 81/08* (2013.01); *E05B 81/64* (2013.01); *G07C 9/00571* (2013.01); *G07C 9/00896* (2013.01); *H04N 7/185* (2013.01); *B60R 2011/004* (2013.01); *B60R 2011/0098* (2013.01); *E05B 2047/0067* (2013.01)

(58) Field of Classification Search
CPC ........ H04N 23/51; H04N 7/185; B60R 11/04; B60R 25/34; B60R 2011/004; B60R 2011/0098; B60R 11/00; B60R 2011/0094; E05B 47/0002; E05B 81/08; E05B 81/64; E05B 2047/0067; G07C 9/00571; G07C 9/00896; G07C 9/00309; G07C 9/00912
See application file for complete search history.

(56) References Cited

U.S. PATENT DOCUMENTS

| | | |
|---|---|---|
| 6,882,269 B2 | 4/2005 | Moreno |
| 8,720,968 B2 | 5/2014 | Zalan et al. |
| 9,637,235 B2 | 5/2017 | Pujol |
| 9,803,391 B2 | 10/2017 | Banvait |
| 11,175,734 B1 * | 11/2021 | Hossain ................ G06F 3/014 |
| 2004/0222645 A1 | 11/2004 | Pirone et al. |
| 2016/0060910 A1 | 3/2016 | Abdelazia |
| 2016/0255254 A1 * | 9/2016 | Freeman ................ G03B 31/00 348/374 |

(Continued)

FOREIGN PATENT DOCUMENTS

WO     2018182564 A1    10/2018

*Primary Examiner* — Lori Lyjak
(74) *Attorney, Agent, or Firm* — Frank A. MacKenzie; Bejin Bieneman PLC (57) ABSTRACT

A vehicle includes an exterior body panel and a sensor assembly supported by the exterior body panel. The sensor assembly includes an image sensor and a cover being moveable to an assembled position at least partially enclosing the image sensor. A pressure sensor is activated by the cover in the assembled position. A lock releasably connects the cover to the exterior body panel and is actuatable framed on the pressure sensor.

20 Claims, 6 Drawing Sheets

(56) References Cited

U.S. PATENT DOCUMENTS

| | | | |
|---|---|---|---|
| 2017/0080861 A1* | 3/2017 | Vora | H04N 23/57 |
| 2017/0094188 A1* | 3/2017 | Kim | H04N 23/661 |
| 2018/0367785 A1* | 12/2018 | Sanlaville | H04N 23/698 |
| 2020/0218136 A1* | 7/2020 | Au | A45C 11/38 |
| 2021/0188261 A1* | 6/2021 | Song | G02B 7/023 |
| 2021/0190516 A1* | 6/2021 | Ventimiglia | G01N 33/0031 |
| 2021/0232642 A1* | 7/2021 | Ricci | G06F 9/451 |

* cited by examiner

SENSOR ASSEMBLY COVER LOCK

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A vehicle includes an exterior body panel, a sensor assembly supported by the exterior body panel and including an image sensor, the sensor assembly including a cover being movable to an assembled position at least partially enclosing the image sensor, a pressure sensor activated by the cover in the assembled position, and a lock releasably connecting the cover to the exterior body panel and actuatable based on the pressure sensor.

The cover may include two side panels spaced from each other and a top panel partially overlapping each side panel. The lock may be between the top panel and the exterior body panel.

The sensor assembly may include a frame mounted to the exterior body panel. The lock may releasably connect the top panel to the frame.

The pressure sensor may be compressed between the top panel and at least one side panel in the assembled position.

The sensor assembly may include a frame mounted to the exterior body panel. The lock may releasably connect the cover to the frame in the assembled position.

The vehicle may include a processor and a memory storing instructions executable by the processor to actuate the lock as a result of the pressure sensor being activated by the cover.

The instructions may further include instructions to upon authenticating a controller, unlock the lock as a result of receiving a message from the controller.

The lock may be a lock including a magnetic surface and an electromagnet releasably engageable with the magnetic surface.

The magnetic surface may be supported by one of the cover and the exterior body panel and the electromagnet may be supported by the other of the cover and the exterior body panel.

The electromagnet may be magnetized in an absence of electric current and demagnetized in a presence of electric current.

A sensor assembly includes a frame, an image sensor and a cover being movable to an assembled position at least partially enclosing the image sensor, a pressure sensor activated by the cover in the assembled position, and a lock releasably connecting the cover to the frame and actuatable based on the pressure sensor.

The cover may include two side panels spaced from each other and a top panel partially overlapping each side panel. The lock may be between the top panel and the frame.

The lock may releasably connect the top panel to the frame.

The pressure sensor may be compressed between the top panel and at least one side panel in the assembled position.

The lock may be a lock including a magnetic surface and an electromagnet releasably engageable with the magnetic surface.

The magnetic surface may be supported by one of the cover and the frame and the electromagnet may be supported by the other of the cover and the frame.

The electromagnet may be magnetized in an absence of electric current and demagnetized in a presence of electric current.

A system includes a computer including a processor and a memory, the memory storing instructions executable by the processor to determine a cover of a sensor assembly is positioned to at least partially enclose an image sensor based on a message from a pressure sensor, the sensor assembly is supported by an exterior body panel of a vehicle, and then actuate a lock to fix the cover relative to the exterior body panel.

The instructions may further include instructions to, upon authenticating a controller, unlock the lock as a result of receiving a message from the controller.

The lock may be a lock including a magnetic surface and an electromagnet releasably engageable with the magnetic surface.

With reference to the Figures, wherein like numerals indicate like parts throughout the several views, a vehicle 10 is generally shown. The vehicle 10 includes an exterior body panel 12 and a sensor assembly 14 supported by the exterior body panel 12. The sensor assembly 14 includes one or more sensors 26, including an image sensor 16, and a cover 18 being moveable to an assembled position at least partially enclosing the image sensor 16. A pressure sensor 20 is activated by the cover 18 in the assembled position. A lock 22 releasably connects the cover 18 to the exterior body panel 12 and is actuatable based on the pressure sensor 20.

Figure 1:
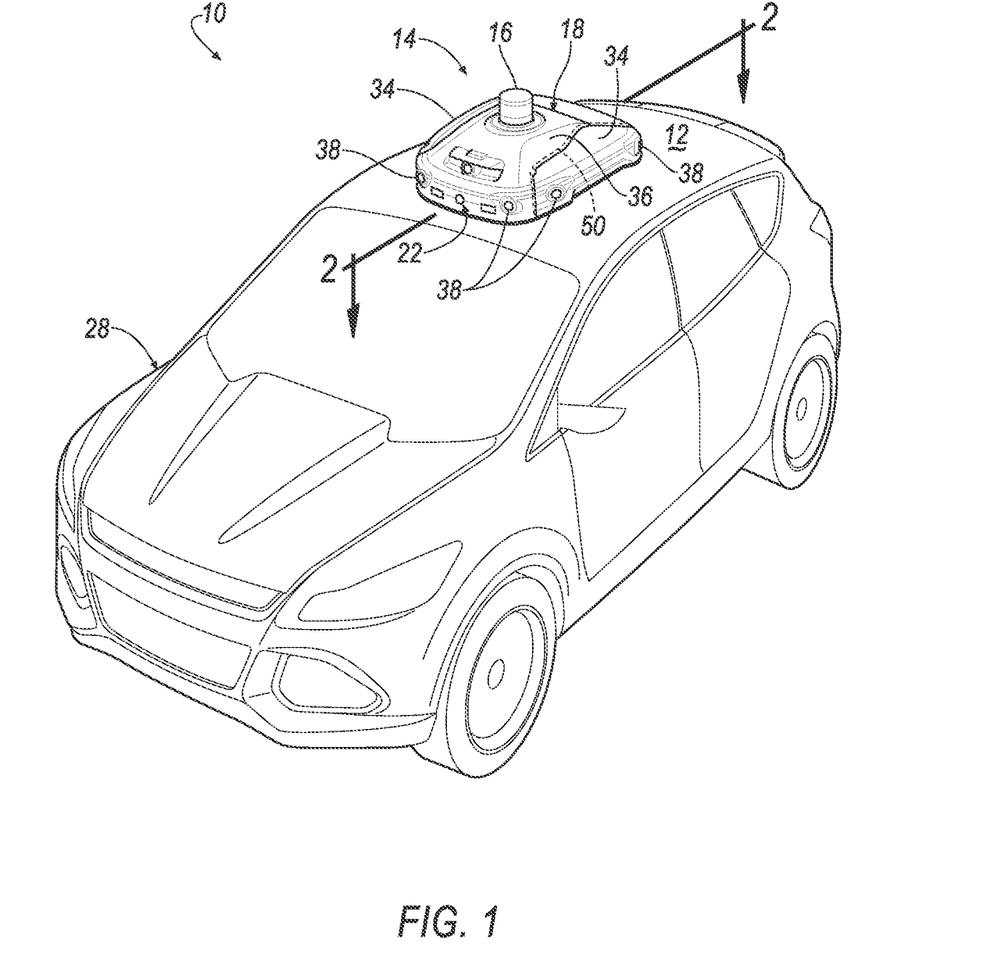
FIG. 1 is a perspective view of an example vehicle with a sensor assembly.
Figure 2:
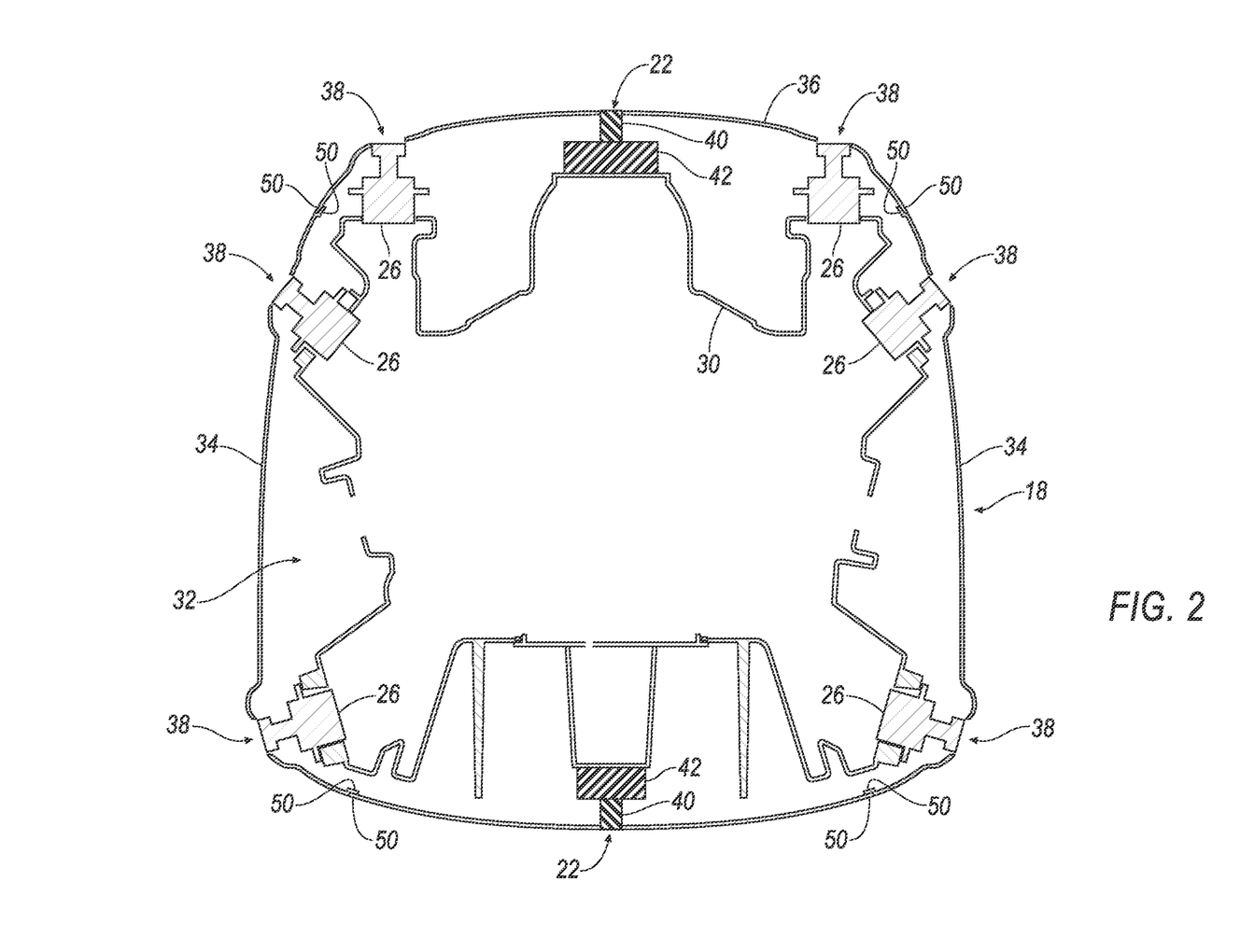
FIG. 2 is a cross-sectional view of a cover of the sensor assembly.
Figure 3:
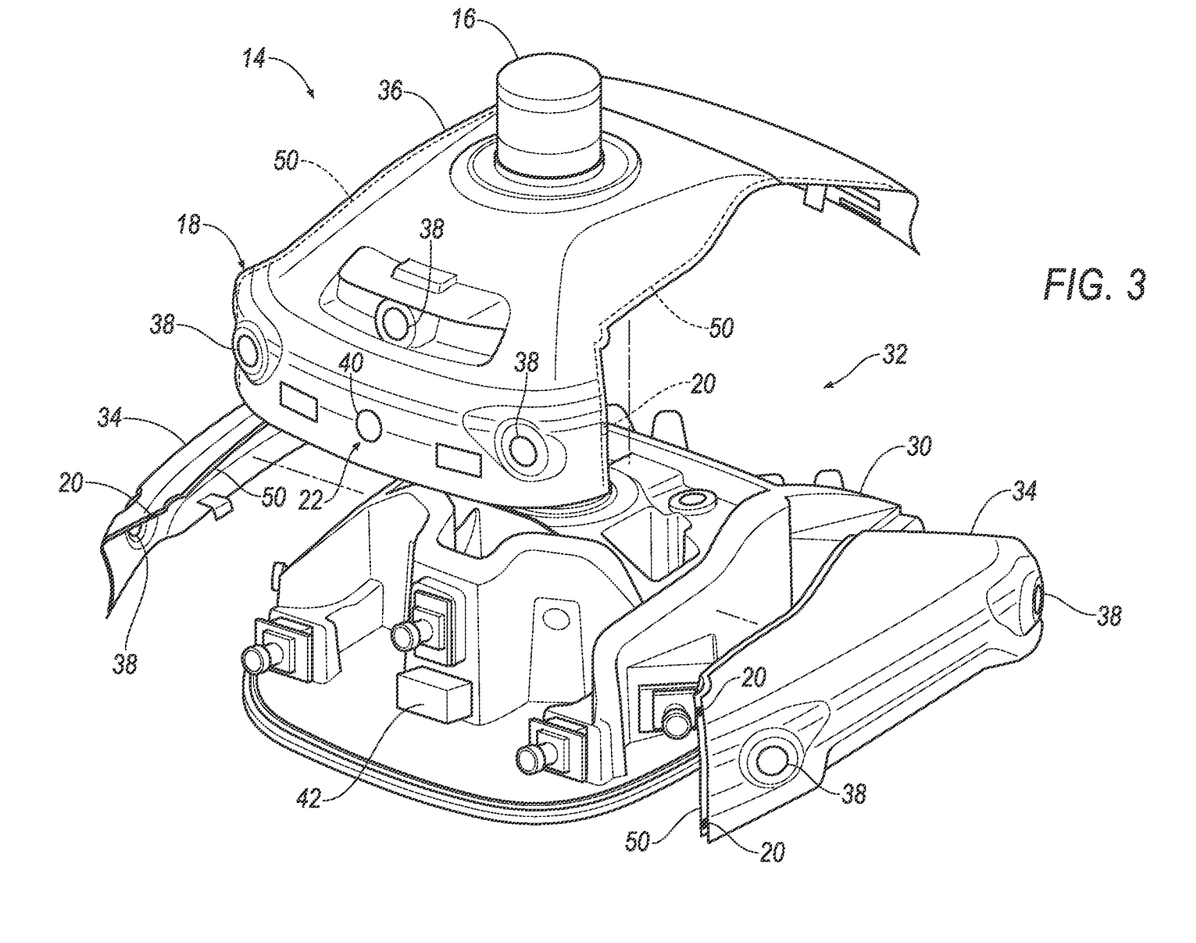
FIG. 3 is an exploded view of the cover of the sensor assembly.
Figure 4:
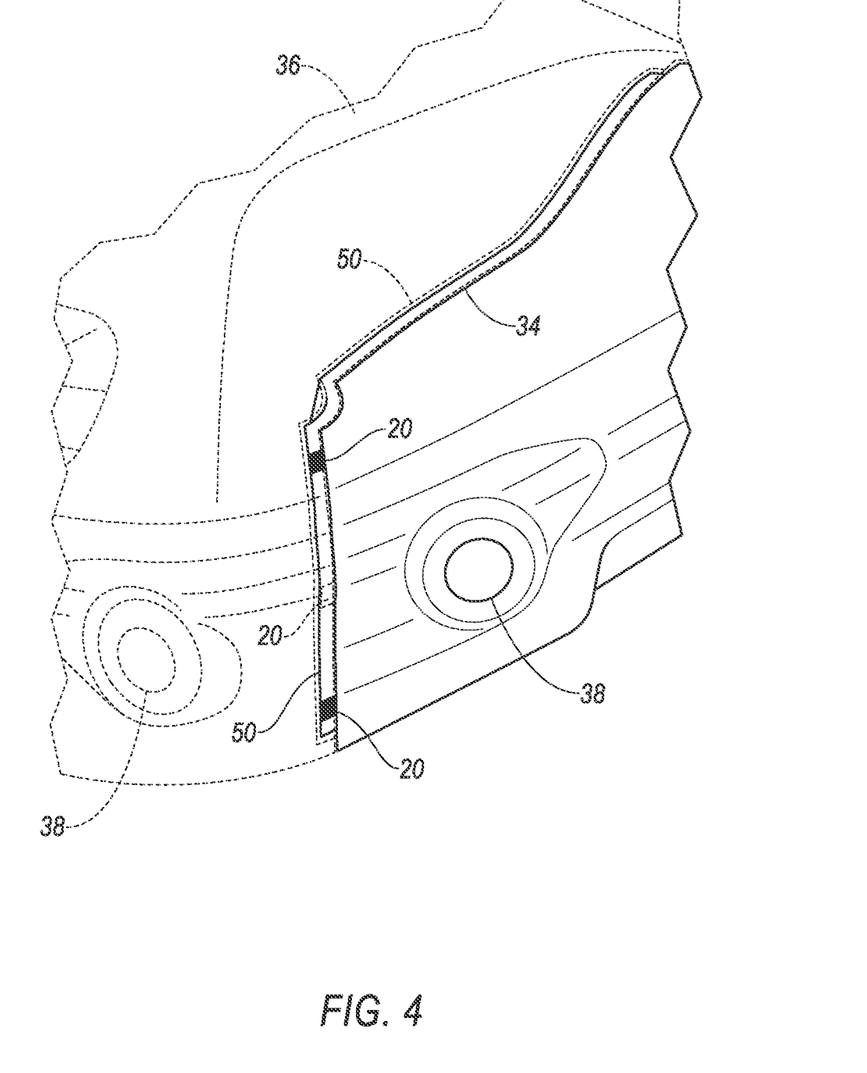
FIG. 4 is a magnified view of one panel of the cover.

The cover 18 may be moveable from an unassembled position, as shown in FIG. 3, to an assembled position, as shown in FIGS. 1, 2 & 4. In the unassembled position, the cover 18 permits access to one or more sensors 26 including the image sensor 16, e.g., to authorized persons to perform service and/or maintenance on the one or more sensors 16, 26. In the assembled position, the cover 18 prevents access to the one or more sensors 26 including the image sensor 16. For example, the cover 18 in the assembled position at least partially encloses the one or more sensors 26 such that the cover 18 in the assembled position prevents access to connections of the one or more sensors 26, including the image sensor 16. Further, the cover 18 in the assembled position prevents the one or more sensors 26, including the image sensor 16, from being removed from the sensor assembly 14. The pressure sensor 20 detects the cover 18 in the assembled position and actuates the lock 22 to fix the cover 18 to the vehicle 10. By fixing the cover 18 to the vehicle 10, the lock 22 prevents the cover 18 from being moved from the assembled position to the unassembled position, which prevents unauthorized persons from accessing the one or more sensors 26, including the image sensor 16.

With reference to FIG. 1, the vehicle 10 may be any passenger or commercial automobile such as a car, a truck, a sport utility vehicle, a crossover, a van, a minivan, a taxi, a bus, etc.

The vehicle 10 may be an autonomous vehicle. A computer 24 can be programmed to operate the vehicle 10 independently of the intervention of a human driver, completely or to a lesser degree. The computer 24 may be programmed to operate propulsion, brake system, steering, and/or other vehicle systems based at least in part on data received from the one or more sensors 26 including the image sensor 16. For the purposes of this disclosure, autonomous operation means the computer 24 controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 10 includes a body 28. The vehicle 10 may be of a unibody construction, in which a frame and the body 28 of the vehicle 10 are a single component. The vehicle 10 may, as another example, be of a body-on-frame construction, in which the frame supports the body 28 that is a separate component from the frame. The frame and body 28 may be formed of any suitable material, for example, steel, aluminum, etc.

With reference to FIG. 1, the body 28 includes one or more exterior body panels 12 partially defining an exterior of the vehicle 10. The exterior body panels 12 may present a class-A surface, e.g., a finished surface exposed to view by a customer and free of unaesthetic blemishes and defects. The exterior body panels 12 include, e.g., a roof, etc.

With continued reference to FIG. 1, the sensor assembly 14 is attachable to the vehicle 10, e.g., to one of the exterior body panels 12 of the vehicle 10, e.g., the roof. For example, the sensor assembly 14 may be shaped to be attachable to the roof, e.g., may have a shape matching a contour of the roof. The sensor assembly 14 may be attached to the roof, which can provide the image sensors 16, 26 with an unobstructed field of view of an area around the vehicle 10. The sensor assembly 14 may be formed of, e.g., plastic or metal.

With reference to FIG. 3, the sensor assembly 14 includes a frame 30 and the cover 18 attachable to the frame 30. The frame 30 may be directly attached to the roof of the vehicle 10 by, e.g., welding, fasteners, etc. For example, the frame 30 may have a bottom surface matching a contour of the roof. In the assembled position, the cover 18 prevents access to the connection between the frame 30 and the roof of the vehicle 10. That is, the cover 18 covers the frame in the assembled position. The cover 18 may enclose and define a cavity 32 when the cover 18 is in the assembled position. The frame 30 partially defines the cavity 32. In other words, the cover 18 and the frame 30 define the cavity 32 therebetween. In the unassembled position, the cover 18 permits access to the connection between the frame 30 and the roof of the vehicle 10. That is, the lock 22 must be unlocked by an authorized person to gain access to the cavity 32. In other words, the lock 22 and the cover 18 assist to deter theft and/or tampering of components covered by the cover 18 in the assembled position. The cover 18 may shield contents of the cavity 32 from external elements such as wind, rain, debris, etc.

The cover 18 may include a plurality of panels 34, 36 engageable from the unassembled position to the assembled position. In the unassembled position, the panels 34, 36 are disengaged from each other, as shown in FIG. 3. In other words, the panels 34, 36 are spaced from each other and moveable relative to each other. In the assembled position, the panels 34, 36 are engaged with each other, i.e., fixed relative to each other, as shown in FIG. 1. For example, the cover 18 may include two side panels 34 spaced from each other and a top panel 36 partially overlapping each side panel 34 in the assembled position, as shown in the Figures. In such an example, each panel may include a flange 50 extending at least partially along a perimeter of the respective panel. The flange 50 of the top panel 36 overlaps and abuts the flanges 50 of each side panel 34 in the assembled position, as shown in FIG. 4. In other words, the top panel 36 partially covers the side panels 34. By overlapping the flange 50 of each side panel 34, the flange 50 of the top panel 36 prevents the side panels 34 from being removed when the cover 18 is in the assembled position. Additionally, or alternatively, the top panel 36 may be fixed to the side panels 34 by fasteners such as screws, bolts, etc. The panels 34, 36 may be fixed to the frame 30 when the cover 18 is in the assembled position in any suitable manner, e.g., fasteners, clips, etc.

The cover 18 may include apertures 38, as shown in the Figures. The apertures 38 are holes in the panels 34, 36 leading from the cavity 32 into the ambient environment. The apertures 38 are through the top panel 36 and the side panels 34. The apertures 38 may be any suitable shape, e.g., circular. The cover 18 includes one aperture for each image sensor 26, 16. Each image sensor 26, 16 has a field of view received through the respective aperture 38. For example, the sensors 26 may extend into the respective apertures 38. In such an example, the aperture 38 may be concentric about a portion of the sensor 26. Alternatively, the aperture 38 may include a covering extending across the aperture 38. The covering may protect the sensor 26 from external elements such as wind, rain, debris, etc. In such an example, the covering may be transparent. In other words, the covering does not obstruct the field of view of the sensor 26. For example, the covering may be glass, plastic, acrylic, etc.

The sensor assembly 14 may include a plurality of sensors including the image sensor 16 and the sensors 26, as shown in FIGS. 2-4. The image sensors 16, 26 may detect the location and/or orientation of the vehicle 10. For example, the image sensors 16, 26 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The image sensors 16, 26 may detect the external world, e.g., objects and/or characteristics of surroundings of the vehicle 10, such as other vehicles, road lane markings, traffic lights and/or signs, pedestrians, etc. For example, the image sensors 16, 26 may include radar sensors, scanning laser range finders, light detection and ranging (LIDAR) devices, and image processing sensors such as cameras. The image sensors 16, 20, 26 may include communications devices, for example, vehicle-to-infrastructure (V2I) or vehicle-to-vehicle (V2V) devices.

With reference to FIGS. 2 and 3, the sensors 26 are disposed in the cavity 32. The sensors 26 may be cameras arranged to collectively cover a 360° horizontal field of view. The sensors 26 may be attached to the frame 30 in the cavity 32, which in turn is directly attached to the roof. Each sensor 26 has a field of view through the respective aperture, and the field of view of one sensor 26 may overlap the fields of view of the sensors 26 that are circumferentially adjacent to one another, i.e., that are immediately next to each other.

The image sensor 16 protrudes upward from the cover 18, as shown in FIGS. 1 and 3. The image sensor 16 may be a camera, a LIDAR device, a radar sensor, etc. The image sensor 16 is disposed above the frame 30 to have an unobstructed 360° horizontal field of view. For example, the image sensor 16 may be supported by the cover 18, e.g., the top panel 36. In this situation, the image sensor 16 may extend at least partially through the cover 18 into the cavity 32. The image sensor 16 may be fixed relative to the cover 18 in the cavity. For example, the cover 18, e.g., the top panel 36, may partially overlap the image sensor 16 such that when the cover 18 is in the assembled position, the cover 18, e.g., the top panel 36, compresses a portion of the image sensor 16 against the frame 30. As another example, the image sensor 16 may be fixed to the cover 18, e.g., the top panel 36, by, e.g., fasteners, clips, etc., in the cavity 32. In other words, the cover 18 in the assembled position prevents the image sensor 16 from moving relative to the frame 30. An authorized person may unlock the lock 22, as described below, to move the cover 18 to the unassembled position and obtain access to the image sensor 16. The image sensor 16 is positioned laterally, i.e., along a left-right dimension relative to the vehicle 10, in a middle of the vehicle 10. The image sensor 16 has a cylindrical shape defining an axis that is oriented substantially vertically.

The pressure sensor 20 is supported by one panel, e.g., the top panel 36, of the cover 18. Specifically, the pressure sensor 20 is fixed to the flange 50 of the one panel, e.g., the top panel 36, as shown in FIG. 3. The pressure sensor 20 is compressed between the top panel 36 and at least one side panel 34 in the assembled position, as shown in FIG. 4. For example, the pressure sensor 20 may be compressed between the flange 50 of the top panel 36 and the flange 50 of one side panel 34 in the assembled position. As set forth above, the pressure sensor 20 is activated by the cover 18 in the assembled position. In other words, the pressure sensor 20 detects the cover 18 in the assembled position. That is, the pressure sensor 20 detects a compressive force between the top panel 36 and at least one side panel 34 when the cover 18 is in the assembled position. In these circumstances, the pressure sensor 20 generates a message indicating the cover 18 is in the assembled position. The pressure sensor 20 may be attached to the respective flange 50 in any suitable manner, e.g., fasteners, adhesive, etc.

The sensor assembly 14 may include any suitable number of pressure sensors 20. For example, the sensor assembly 14 may include a plurality of pressure sensors 20, as shown in FIGS. 3 and 4. In such an example, the sensor assembly 14 may, for example, include at least one pressure sensor 20 attached to the flange 50 of each side panel 34. Additionally, or alternatively, the sensor assembly 14 may include two or more pressure sensors 20 attached to the flange 50 of the top panel 36. In these circumstances, each pressure sensor 20 may, for example, be compressed between the flange 50 of the top panel 36 and the flange 50 of one respective side panel 34 when the cover 18 is in the assembled position. As another example, the sensor assembly 14 may include one pressure sensor 20. In such an example, the pressure sensor 20 may be fixed to the flange 50 of the top panel 36. The pressure sensor 20 may, for example, extend along the flange 50 of the top panel 36 from one side panel 34 to the other side panel 34. In these circumstances, the pressure sensor 20 may be compressed between the top panel 36 and each side panel 34 when the cover 18 is in the assembled position.

The lock 22 is actuatable from an unlocked position to a locked position. In the unlocked position, the lock 22 permits relative movement between the cover 18 and the exterior body panel 12, i.e., the frame 30. In the locked position, the lock 22 restricts relative movement between the cover 18 and the exterior body panel 12, i.e., the frame 30. In other words, in the locked position, the lock 22 fixes the cover 18 relative to the exterior body panel 12, i.e., the frame 30.

The lock 22 is between the cover 18 and the exterior body panel 12. In particular, the lock 22 is between the cover 18 and the frame 30 of the sensor assembly 14, as shown in FIG. 2. For example, the lock 22 may be between the top panel 36 and the frame 30. That is, the lock 22 releasably connects the cover 18, e.g., the top panel 36, to the frame 30 of the sensor assembly 14. The lock 22 may include locking elements 40, 42 releasably engageable with each other. One locking element 40 is supported by the exterior body panel 12 and the other locking element 42 is supported by the cover 18. In the locked position, the locking elements 40, 42 are fixed to each other. In the locked position, the locking elements 40, 42 are engaged in the cavity 32. That is, the cover 18 conceals. i.e., shields from view, the engagement between the locking elements 40, 42 from the external environment when the cover 18 is in the assembled position. By concealing the engagement of the locking elements 40, 42, the cover 18 in the assembled position may assist in deterring tampering of the lock 22 in the locked position. In the unlocked position, the locking elements 40, 42 are moveable relative to each other.

The lock 22 may be any suitable type of lock. For example, the lock 22 may be a magnetic lock, as shown in the Figures. In such an example, the locking elements 40, 42 of the lock 22 may include a magnetic surface and an electromagnet releasably engageable with the magnetic surface. The magnetic surface may be supported by one of the cover 18 and the exterior body panel 12, and the electromagnet may be supported by the other of the cover 18 and the exterior body panel 12. For example, the electromagnet may be fixed to the frame 30 of the sensor assembly 14 and the magnetic surface may be fixed to the cover 18, e.g., the top panel 36, as shown in FIG. 2. As another example, the magnetic surface may be fixed to the frame 30 of the sensor assembly 14, and the electromagnet may be fixed to the cover 18. As yet another example, the electromagnet may be fixed to the exterior body panel 12 and the magnetic surface may be fixed to the cover 18. The magnetic surface may be any suitable material that is magnetic, e.g., nickel, cobalt, iron, etc.

The electromagnet produces a magnetic field based on electric current. For example, the electromagnet may be magnetized by an absence of electric current and demagnetized in the presence of electric current. In other words, the electromagnet may produce a magnetic field when no electric current is provided to the electromagnet and may not produce a magnetic field when electric current is provided to the electromagnet. When the electromagnet is magnetized, the magnetic surface is magnetically attracted to the electromagnet. In this situation, the magnetic surface is fixed relative to the electromagnet, i.e., the lock 22 is in the locked position. When the electromagnet is demagnetized, the magnetic surface is not magnetically attracted to the electromagnet. In this situation, the magnetic surface is moveable relative to the electromagnet, i.e., the lock 22 is in the unlocked position.

As another example, the lock 22 may be a mechanical lock, e.g., a solenoid (not shown). In such an example, the locking elements 40, 42 of the lock 22 may include a pin and a hole. The lock 22 may include circuits, chips, actuators, etc. configured to move the lock 22 from the unlocked position to the locked position, e.g., in response to a command from the computer 24. The lock 22 may transmit a message to the computer 24 indicating whether the lock 22 is in the locked position or the unlocked position.

The sensor assembly 14 may include any suitable number of locks 22. For example, the sensor assembly 14 may include a plurality of locks 22 spaced from each other. In such an example, the locks 22 may be spaced from each other any suitable amount, e.g., evenly spaced around the cover 18. As another example, the sensor assembly 14 may include one lock 22. In such an example, the lock 22 may be disposed at any suitable position around the cover 18, e.g., in a position such that the lock 22 faces in a vehicle forward direction.

The vehicle 10 may include a communication network 44. The communication network 44 includes hardware, such as a communication bus, for facilitating communication among vehicle components, such as the sensors 16, 20, 26, the computer 24, the lock 22, etc. The communication network 44 may facilitate wired or wireless communication among the vehicle components in accordance with a number of communication protocols such as controller area network (CAN), Ethernet, WiFi, Local Interconnect Network (LIN), and/or other wired or wireless mechanisms The computer, implemented via circuits, chips, or other electronic components, is included in the vehicle 10 for carrying out various operations, including as described herein. The computer is a computing device that generally includes a processor and a memory, the memory including one or more forms of computer-readable media and storing instructions executable by the processor for performing various operations, including as disclosed herein. The computer may be programmed by storing instructions on the memory that are executable by the processor.

The memory further generally stores remote data received via various communications mechanisms; e.g., the computer is generally configured for communications on a controller area network (CAN) bus or the like, and/or for using other wired or wireless protocols, e.g., Bluetooth, etc. The computer may also have a connection to an onboard diagnostics connector (OBD-II). Via the communication network 44, Ethernet, WiFi, CAN bus, Local Interconnect Network (LIN), and/or other wired or wireless mechanisms, the computer may transmit messages to various devices in the vehicle 10 and/or receive messages from the various devices, e.g., the sensors 16, 20, 26, etc. Although one computer is shown for ease of illustration, it is to be understood that the computer could include, and various operations described herein could be carried out by, one or more computing devices.

Figure 5:
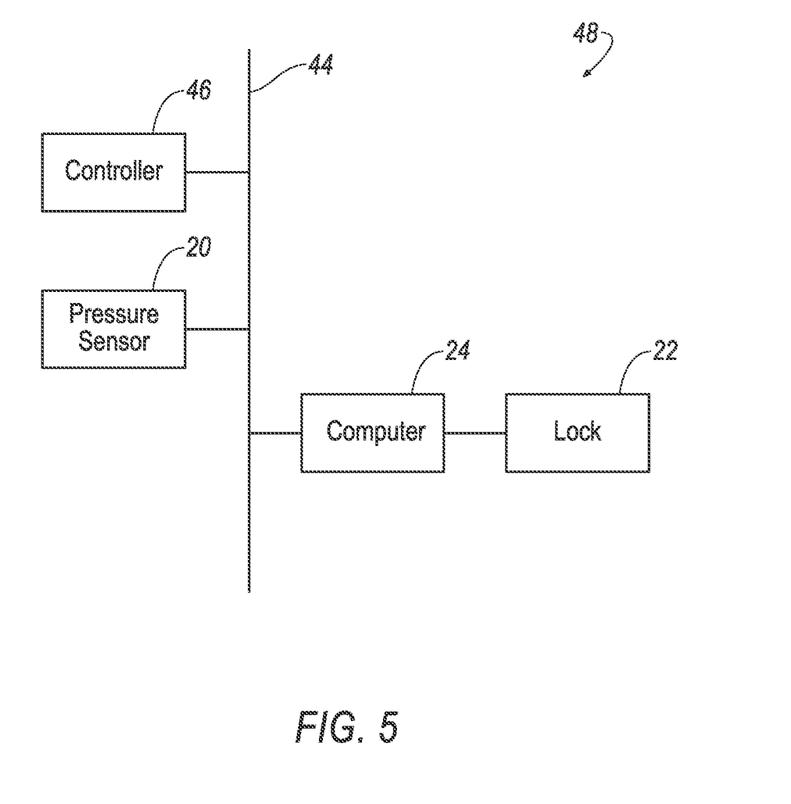
FIG. 5 is a block diagram of a lock system for the sensor assembly.

With reference to FIG. 5, the vehicle 10 may include a locking system 48 including the pressure sensor 20, the lock 22, the computer 24, and a controller 46. The controller 46 may be a conventional computing device, i.e., including one or more processors and one or more memories, programmed to provide operations such as disclosed herein. The controller 46 is coupled to the vehicle communications network 44 and can send and/or receive messages to/from the computer and other vehicle sub-systems. For example, the controller 46 is programmed to transmit a message to the computer 24 requesting actuation of the lock 22 to the unlocked position. That is, a user may request to unlock the lock 22 via the controller 46.

The controller 46 may be supported by the vehicle 10 or separate from the vehicle 10. For example, the controller 46 may be a key fob that is moveable relative to the vehicle 10. The key fob includes an input device such as a button that can receive input from the user. As another example, the controller 46 may be a human machine interface of the vehicle 10. The human-machine interface (HMI) includes input devices such as knobs, buttons, switches, touch screens, microphones, etc. that can receive input from a user. Upon receiving the user input, the controller 46 may transmit a message to the computer indicating the user input, e.g., a request to unlock the lock 22.

To prevent an intruder computer from unlocking the lock 22, the computer may be programmed to authenticate the controller 46. The computer may be programmed to perform an authentication based on a key, e.g., a combination of numbers and/or characters, received from the controller 46 upon communicating with the computer. In another example, the computer may be programmed to receive, from the controller 46, a request including an access code, e.g., a secret code known to certain parties such as vehicle distributors, e.g., dealers, for unlocking the lock 22. The computer may actuate the lock 22 to the unlocked position upon determining that the received access code matches an expected access code, e.g., based on stored information in the computer. In such an example, the access code may be manually entered by the user, e.g., via a touchscreen display, or transmitted from, e.g., a key fob for the vehicle 10.

Authentication of a digital communication or message as discussed herein means implementing a scheme for determining an authenticity (or lack thereof) of the communication or message, e.g., a message from the controller 46 to the computer requesting to unlock the lock 22. Various known techniques such as an authentication signature (or digital signature) may be used for authentication. A valid authentication signature included in a received message may give the computer a reason to conclude that the message was created by a known sender, e.g., a known controller 46.

The computer 24 may be programmed to actuate the lock 22 from the unlocked position to the locked position, and vice versa. For example, the computer 24 may transmit commands to the lock 22, e.g., via the vehicle communications network 44, instructing actuation of the lock 22 to the locked position or the unlocked position.

The computer 24 may actuate the lock 22 from the unlocked position to the locked position, e.g., to fix the cover 18 relative to the exterior body panel 12, when the cover 18 is in the assembled position. The computer 24 can determine the cover 18 is in the assembled position as a result of the pressure sensor 20 being activated by the cover 18. For example, when the cover 18 is in the assembled position, the pressure sensor 20 is activated and transmits a message indicating the cover 18 is in the assembled position to the computer 24. Upon receiving the message, the computer 24 actuates the lock 22 to the locked position. For example, the computer 24 can instruct an actuator (not shown) to open a circuit (not shown) to stop providing electric current to the lock 22, which magnetizes the electromagnet.

The computer 24 may actuate the lock 22 from the locked position to the unlocked position, e.g., to permit removal of the cover 18 from the sensor assembly 14, as a result of receiving a message from the controller 46 to unlock the lock 22. Upon receiving the message from the controller 46, the computer 24 may authenticate the controller 46, as described above. In the case the controller 46 is authenticated, the computer 24 actuates the lock 22 to the unlocked position. For example, the computer can instruct an actuator to close the circuit to provide electric current to the lock 22, which demagnetizes the electromagnet. Otherwise, the computer maintains the lock 22 in the locked position.

Figure 6:
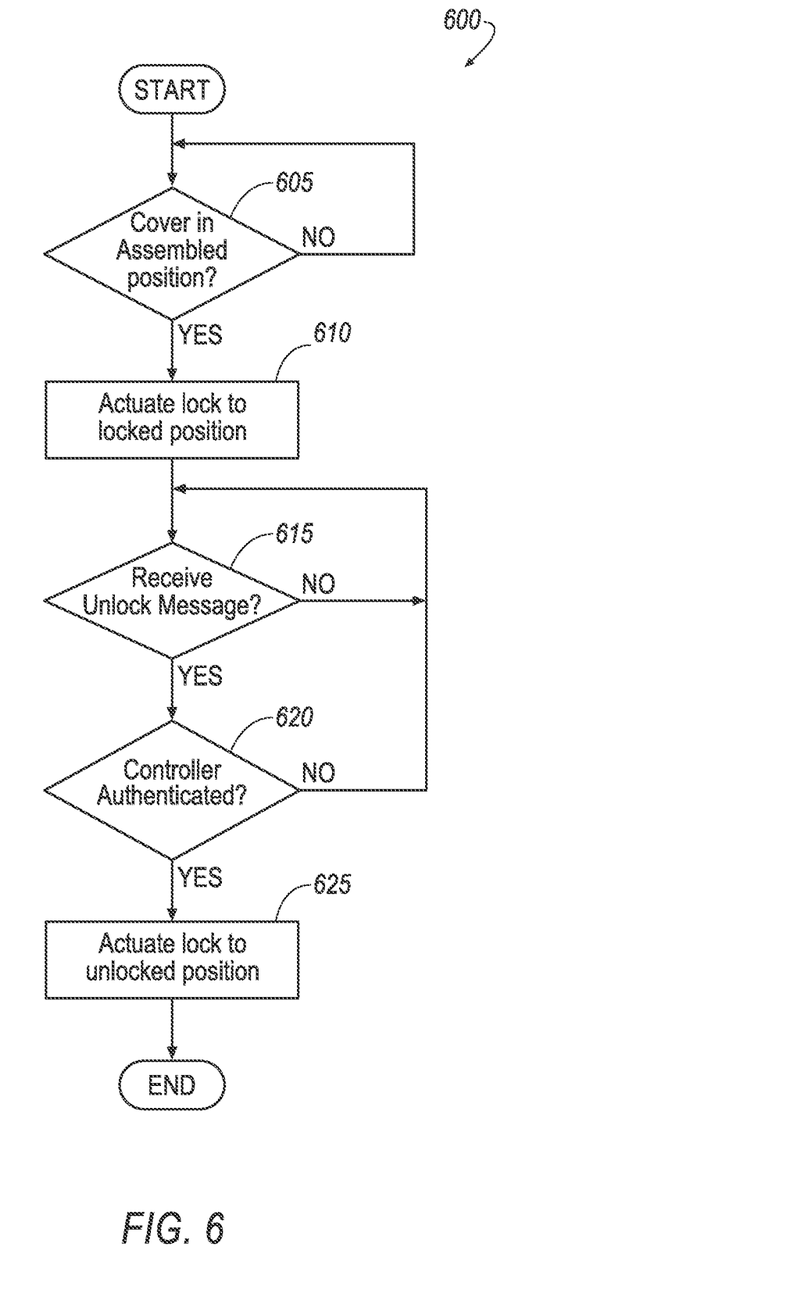
FIG. 6 is a process flow diagram of an example process for locking the sensor assembly.

FIG. 6 is a process flow diagram illustrating an exemplary process 600 for controlling the lock 22 of the sensor assembly 14, in particular locking and unlocking the lock 22. The memory of the computer stores executable instructions for performing the steps of the process 600. As a general overview of the process 600, the computer 24 locks the lock 22 when the cover 18 is in the assembled position and unlocks the lock 22 when a controller 46 sends a message to unlock the lock 22.

The process 600 begins in a block 605, in which the computer 24 determines whether the cover 18 is in the assembled position. The pressure sensor 20 is activated when the cover 18 is in the assembled position. That is, the pressure sensor 20 is compressed between at least two panels 34, 36 of the cover 18. When the pressure sensor 20 is activated, the pressure sensor 20 transmits a message to the computer 24 indicating the cover 18 is in the assembled position. In the case that the computer 24 receives the message from the pressure sensor 20, the computer determines the cover 18 is in the assembled position. Otherwise, the computer 24 determines the cover 18 is in the unassembled position. If the cover 18 is in the assembled position, the process 600 continues in a block 610. Otherwise, the process 600 remains in the block 605.

In the block 610, the computer 24 locks the lock 22. For example, the computer 24 can transmit a command to the actuator to open the circuit to stop providing electric current to the lock 22, which magnetizes the electromagnet. As another example, the computer 24 can transmits a command to the lock 22 instructing actuation to the locked position. In this situation, the lock 22 prevents relative movement between the cover 18 and the frame 30, i.e., the exterior body panel 12. The process 600 continues in a block 615.

In the block 615, the computer 24 determines whether a message requesting to actuation of the lock 22 to the unlocked position has been received, e.g., from the controller 46. Upon determining that such a message has been received, the process 600 continues in a block 620. Otherwise, the process 600 remains in the block 615.

In the block 620, the computer 24 determines whether the controller 46 is authenticated. The computer 24 authenticates the controller 46, e.g., by verifying an access code. Upon authenticating the controller 46, the process 600 continues in a block 625. Otherwise, the process 600 returns to the block 615.

In the block 625, the computer 24 unlocks the lock 22. For example, the computer 24 can transmit a command to the actuator to close the circuit to provide electric current to the lock 22, which demagnetizes the electromagnet. As another example, the computer 24 can transmit a command to the lock 22 instructing actuation to the unlocked position. In this situation, the lock 22 permits relative movement between the cover 18 and the frame 30, i.e., the exterior body panel 12. The process 600 may end after the block 635. Alternatively, the process 600 may return to the block 605.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Dataframes, data repositories or other data stores described herein may include various kinds of mechanisms for storing, accessing, and retrieving various kinds of data, including a hierarchical dataframe, a set of files in a file system, an application dataframe in a proprietary format, a relational dataframe management system (RDBMS), a non-relational dataframe (NoSQL), a graph dataframe (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first," "second," "third," "fourth," "fifth," and "sixth" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle, comprising:
   an exterior body panel;
   a sensor assembly supported by the exterior body panel and including an image sensor, the sensor assembly including a cover being movable to an assembled position at least partially enclosing the image sensor;
   a pressure sensor activated by the cover in the assembled position; and
   a lock releasably connecting the cover to the exterior body panel and actuatable based on the pressure sensor.

2. The vehicle of claim 1, wherein the cover includes two side panels spaced from each other and a top panel partially overlapping each side panel, the lock is between the top panel and the exterior body panel.

3. The vehicle of claim 2, wherein the sensor assembly includes a frame mounted to the exterior body panel, the lock releasably connects the top panel to the frame.

4. The vehicle of claim 2, wherein the pressure sensor is compressed between the top panel and at least one side panel in the assembled position.

5. The vehicle of claim 1, wherein the sensor assembly includes a frame mounted to the exterior body panel, the lock releasably connects the cover to the frame in the assembled position.

6. The vehicle of claim 1, further comprising a processor and a memory storing instructions executable by the processor to actuate the lock as a result of the pressure sensor being activated by the cover.

7. The vehicle of claim 6, wherein the instructions further include instructions to, upon authenticating a controller, unlock the lock as a result of receiving a message from the controller.

8. The vehicle of claim 1, wherein the lock includes a magnetic surface and an electromagnet releasably engageable with the magnetic surface.

9. The vehicle of claim 8, wherein the magnetic surface is supported by one of the cover and the exterior body panel and the electromagnet is supported by the other of the cover and the exterior body panel.

10. The vehicle of claim 8, wherein the electromagnet is magnetized in an absence of electric current and demagnetized in a presence of electric current.

11. A sensor assembly comprising:
    a frame;
    an image sensor and a cover being movable to an assembled position at least partially enclosing the image sensor;
    a pressure sensor activated by the cover in the assembled position; and
    a lock releasably connecting the cover to the frame and actuatable based on the pressure sensor.

12. The sensor assembly of claim 11, wherein the cover includes two side panels spaced from each other and a top panel partially overlapping each side panel, the lock is between the top panel and the frame.

13. The sensor assembly of claim 12, wherein the lock releasably connects the top panel to the frame.

14. The sensor assembly of claim 12, wherein the pressure sensor is compressed between the top panel and at least one side panel in the assembled position.

15. The sensor assembly of claim 11, wherein the lock includes a magnetic surface and an electromagnet releasably engageable with the magnetic surface.

16. The sensor assembly of claim 15, wherein the magnetic surface is supported by one of the cover and the frame and the electromagnet is supported by the other of the cover and the frame.

17. The sensor assembly of claim 15, wherein the electromagnet is magnetized in an absence of electric current and demagnetized in a presence of electric current.

18. The sensor assembly of claim 1, comprising a computer including a processor and a memory, the memory storing instructions executable by the processor to:
    determine that the cover of the sensor assembly is positioned to at least partially enclose the image sensor based on a message from the pressure sensor; and
    then actuate the lock to fix the cover relative to the exterior body panel.

19. The sensor assembly of claim 18, wherein the instructions further include instructions to, upon authenticating a controller, unlock the lock as a result of receiving a message from the controller.

20. The sensor assembly of claim 18, wherein the lock includes a magnetic surface and an electromagnet releasably engageable with the magnetic surface.

* * * * *